March 27, 1951 — I. W. LOVELADY — 2,546,269
METHOD AND APPARATUS FOR TREATING LIQUID MIXTURES
Filed Oct. 18, 1946 — 2 Sheets-Sheet 1
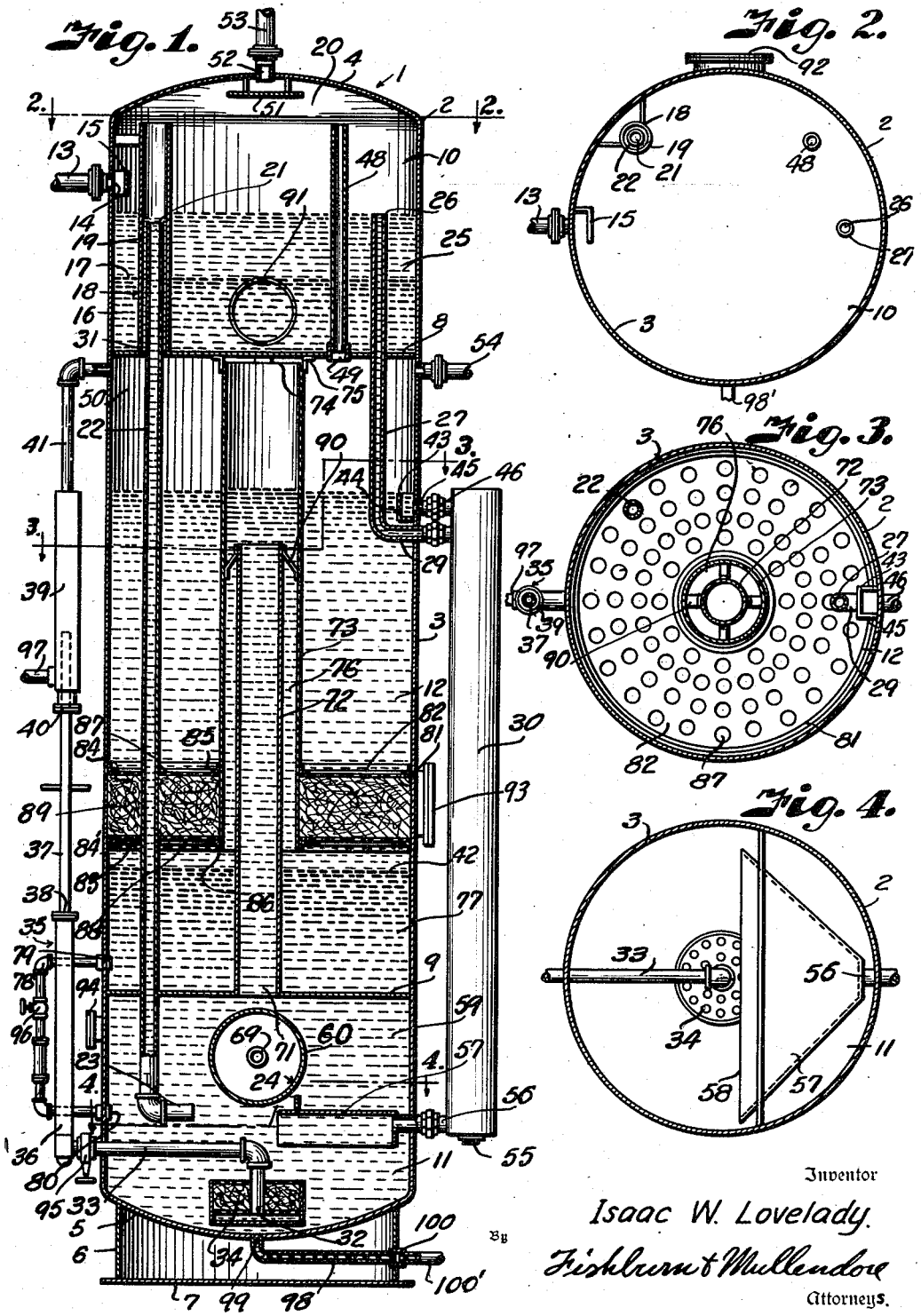
Inventor
Isaac W. Lovelady March 27, 1951  I. W. LOVELADY  2,546,269
METHOD AND APPARATUS FOR TREATING LIQUID MIXTURES
Filed Oct. 18, 1946  2 Sheets-Sheet 2
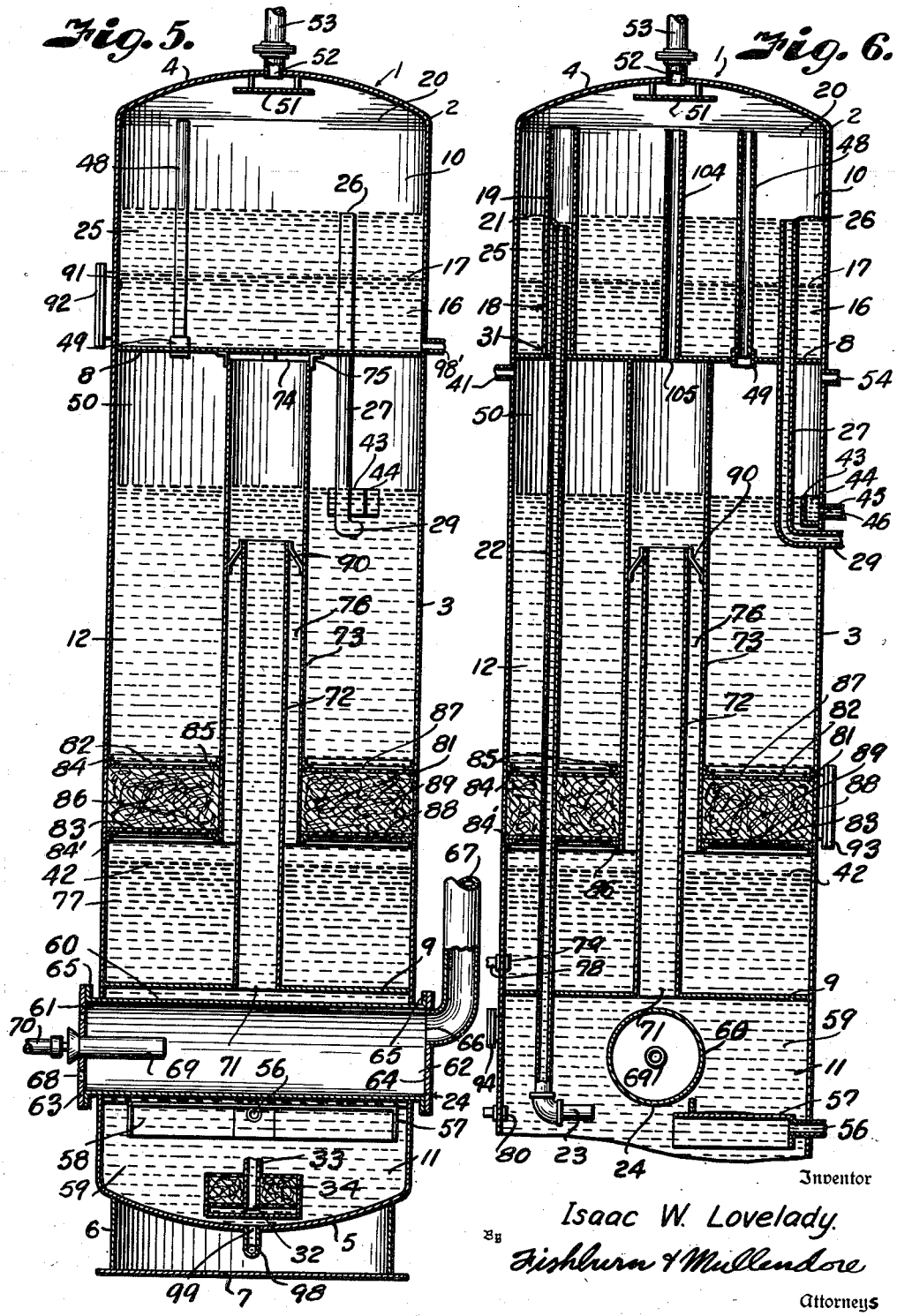
Inventor
Isaac W. Lovelady,
By Fishburn & Mullendore
Attorneys Patented Mar. 27, 1951

2,546,269

UNITED STATES PATENT OFFICE 2,546,269

METHOD AND APPARATUS FOR TREATING LIQUID MIXTURES

Isaac W. Lovelady, Oklahoma City, Okla., assignor to Black Sivalls & Bryson, Inc., Kansas City, Mo., a corporation of Delaware Application October 18, 1946, Serial No. 704,177

18 Claims. (Cl. 183—2.7)

1

This invention relates to a method and apparatus for treating liquid mixtures such as the flow from a petroleum producing well and particularly mixtures that contain proportions of the components of the mixtures as an emulsion.

The principal object of the present invention is to provide a high capacity method and apparatus for economically and efficiently treating mixtures, especially oil, gas and water mixtures containing emulsions and to effect separation of the components in a shorter processing time.

In carrying out this object of the invention, the invention contemplates removal of the free gas and water components from the emulsion component prior to heat treatment of the emulsion and to utilize the heat contained in the separated oil for preheating the emulsion while the cold or unheated free water and gas components are utilized in effecting condensation of gas evolved during the heat treatment of the emulsion.

It is also a prime object of the invention to provide a method and apparatus for processing such mixtures which provides for removal of the free water in a manner to conserve any oil or oil emulsion that may be entrained therewith and yet minimize the load on the heater.

Other objects of the invention are to provide a relatively simple and inexpensive apparatus; to provide for substantially continuous and straightaway flow of the emulsion through the heat treating and settling zones; and to provide an apparatus adapted for use of filters when filters are required to promote separation of the oil and water components of a petroleum mixture when the density of the oil approaches the density of the water.

Further objects of the invention are to provide a structure and method which prevents release of gas through the separated oil and permits the oil to remain in a quiescent state; to provide a plurality of chambers in a treating vessel wherein water may be separated from the oil and/or oil emulsion; to provide a simplified piping hook-up of the treating apparatus; and to provide an apparatus constructed to facilitate inspection and cleaning of the various treating compartments.

In accomplishing these and other objects of the invention hereinafter pointed out, I have provided improved structure, the preferred form of which is illustrated in the accompanying drawings wherein:

Fig. 1 is a vertical section through a separating and treating apparatus constructed in accordance with and for practicing the method of the present invention.

2

Fig. 2 is a horizontal section taken through the free water, gas and emulsion separating compartment of the apparatus on the line 2—2 of Fig. 1.

Fig. 3 is a horizontal section through the settling compartment of the apparatus on the line 3—3 of Fig. 1.

Fig. 4 is a horizontal section through the heating compartment of the apparatus taken on the line 4—4 of Fig. 1.

Fig. 5 is a vertical section through the apparatus taken at right angles with respect to the section illustrated in Fig. 1.

Fig. 6 is a vertical section through a modified form of apparatus embodying the features of the present invention.

Referring more in detail to the drawings:

1 designates a liquid treating apparatus for separating a mixture of liquids and includes a substantially elongated vessel or tank 2 having a cylindrical side wall 3 closed at the upper and lower ends by heads 4 and 5. The vessel is supported in vertical position on a base ring 6 welded or otherwise attached to the bottom head 5 and secured to an anchoring plate 7 that is adapted to be attached to any suitable foundation (not shown). Extending transversely within the vessel and spaced inwardly from the respective heads 4 and 5 are partitions 8 and 9 dividing the vessel into a free water, gas and emulsion separating compartment 10 at the top, a water wash and heat treating compartment 11 at the bottom and an intermediate settling compartment 12, the partition 8 forming the bottom of the separating compartment 10 and the top of the settling compartment 12, while the partition 9 forms the bottom of the settling compartment and the top of the heat treating and water wash compartment 11.

A liquid mixture to be separated and treated is delivered into the compartment 10 at a point above the level of liquid to be maintained therein, through a duct 13 that is connected with the inlet port 14 in the wall of the tank. The flow is preferably baffled and caused to travel circumferentially of the compartment by means of a guard 15 to promote separation of free water and free gas from the oil and oil and water emulsion components of the flow. The free water contained in the flow being the heaviest liquid settles to the bottom of the compartment and the oil and oil emulsion rises to the top of the water. The water thus collects in a bottom layer 16 and rises to a level 17 that is maintained by a water discharge siphon 18 which includes an outer tube 19 supported at its lower end on the partition 8 and which extends upwardly into a gas collecting space 20 at the top of the chamber. The tube 19 encloses the inlet end 21 of a water conductor pipe 22 that leads downwardly through the partitions 8 and 9 and terminates in a lateral outlet 23 located in the chamber 11 and discharges below a heater 24 later described.

The oil and oil emulsion collects in a layer 25 upon the top of the free water and flows from the compartment 10 when the level reaches the inlet 26 of a discharge conductor pipe 27 that leads downwardly through the partition 8 and terminates in a lateral bend 29 that extends through the wall 3 and connects with a heat exchanger 30 located exteriorly of the vessel 2. The inlet 21 of the free water discharge conductor 22 is located so that the hydrostatic head of the layers of water and oil emulsion 16 and 25 cause movement of the water through a port 31 at the lower end of the tube 19 and discharge of the water when the water level tends to rise above the desired level. The conductor pipe 22 conducts the free water downwardly within the tank to the chamber 11, the water being relatively heavier and colder than the water contained in the chamber 11, quickly gravitates and passes through the inlet 32 of a duct 33. The inlet 32 of the conductor 33 may be covered by a filter 34 to eliminate the possibility of any oil being carried off with the water. The filter 34 has an open top and the water flows downwardly through the filter medium and then upwardly into the duct 33. The duct 33 leads through the side wall of the vessel and connects with a water discharge siphon 35.

The siphon 35 includes a fixed pipe section 36 that extends upwardly alongside the vessel. A telescoping section 37 slides in the fixed section and projects through a slip union 38 into a tubular member 39 through a slip union 40. The tubular member 39 is connected at its upper end by a conductor 41 which connects with the upper portion of the compartment 12 at a point directly below the bottom of the partition 8 whereby pressure acting upon the head of liquids in the compartments 11 and 12 is equalized with the pressure in the tubular member 39 so that a predetermined water level as indicated at 42 may be maintained within the lower portion of the settling chamber 12. The discharge end of the telescoping section 37 may be positioned at a height related to the hydrostatic level in the compartment 12 to maintain the desired water level 42. The top liquid level in the compartment 12 is fixed by an overflow weir 43 of an outlet box 44 that is attached to the inner side of the wall 3. The outlet box covers a port 45 which connects by a pipe 46 with the heat exchanger 30.

The partition 8 also carries a pressure equalizing tube 48 having its lower end connected in a collar 49 mounted in the partition and through which pressure within the gas space 50 in the top of compartment 12 is equalized with the gas in the space 20 of the compartment 10. The free gas separated in the compartment 10 passes upwardly within the space 20 and over a spray deflector 51 guarding the inlet 52 to a gas discharge pipe 53. Another outlet for the free gas might be by way of the equalizer tube 48 into the gas space 50 and then through a pipe 54 that is connected with a port in the side wall 3 located under the partition 8.

The heat exchanger 30 may be of any suitable type adapted to effect transfer of heat from hot oil to the relatively cool emulsion discharged from the conductor pipe 27. The oil upon giving up its heat to the emulsion is discharged from the bottom of the heat exchanger through an outlet connection 55 while the preheated emulsion is discharged through a conductor 56 leading through the wall 3 into a compartment 11. The outlet end of the pipe 56 carries a distributor pan 57 having a substantially elongated horizontal outlet 58 located below the heater 24 whereby the oil discharged is caused to spread laterally and rise upwardly under the heater and upwardly in contact with the sides of the heater, and through the body of wash water 59 that is maintained in the compartment 11.

The heater may be of any suitable design but is shown in the drawing as including a transversely arranged tube 60 having the ends 61 and 62 thereof carried in opposite diametric sides of the wall 3 as best shown in Fig. 5. The ends of the tube are closed by heads 63 and 64 attached to flanges 65. The head 64 has an outlet connection 66 with the flue pipe 67 leading upwardly alongside the wall of the vessel to terminate at sufficient height for maintaining desired draft through air inlet openings 68 that are provided in the head 63. The head 63 supports a burner 69, preferably capable of using a portion of the free gas discharged from the treater and which is supplied to the burner through a pipe 70.

Much of the emulsion will be broken upon movement thereof about the respective sides of the heater tube and the released water will gravitate through the water wash in substantially rapid movement since the lower portion of the chamber is maintained at a substantially lower temperature incidental to admission of the relatively cool free water that is being admitted thereto when the apparatus is in operation.

Freed oil, evolved gas, and any water remaining in emulsion or entrained with the oil are discharged from the compartment 11 through an opening 71 in the partition 9 and rise through a stand pipe or tube 72 that extends upwardly within the settling chamber and terminates below the level of the layer of oil that is maintained therein. The upper end of the tube extends within an outer tube 73 that has its upper end spaced from the partition 8 to provide an outlet opening 74 for the evolved gas. The tube 73 is suspendedly supported from the bottom of the partition 8 by suitable brackets 75 and the tube is of substantially larger diameter than the tube 72 to provide an annular passageway 76 therebetween which opens into the lower portion of the settling chamber at a point above the water level 42 maintained therein so that the liquids rising from the heat treating compartment must travel upwardly through the tube 72 and then downwardly through the tube 73. The freed water will collect in a body of water indicated at 77 which is discharged through a duct 78 connected with an outlet opening 79 in the side wall 3 of the tank and which extends downwardly exteriorly of the tank to connect with a lateral opening 80 located in the wall 3 at a lower level for discharging the water from the settling compartment into the heating chamber for discharge along with the free water and water accumulating incidental to breaking of any of the emulsion in the chamber 11 and tube 72.

If the gravity of the oil be low and if considerable emulsion be present, it may be desirable to install a filter section 81 through which all of the oil and the emulsion must pass, but the filter is effective in removing the water of the emulsion and the water will remain at the bottom of the chamber for discharge through the outlet 78.

The filter may comprise vertically spaced ring-like diaphragms 82 and 83 encircling the lower end of the tube 73 and having support by clips 84 and 84' on the inner side of the wall 3 and clips 85 and 86 on the tube 73. The diaphragms are provided with perforations 87 and 88 for passing the oil and they retain a body of filtering medium 89 therebetween. The tube 72 is stabilized within the tube 73 by brackets 90 as shown in Fig. 1.

The tank may be provided with various accessories such as a cleanout opening 91 located in the wall 3 at a point above the partition 8 and which is closed exteriorly of the tank by a cover plate 92. A cleanout opening may also be located in the wall of the tank in registry with the filter and closed by a cover plate 93. The lower compartment 11 may also have an inspection fitting 94 (Fig. 1).

Water is discharged through the conductor 32 and pipe 78 under control of hand operated valves 95 and 96. The final discharge for the water component of the flow from the siphon chamber 39 is a pipe 97 that is adapted to lead to a suitable point of water disposal.

The purified oil after passing through the heat exchanger is cooled and conducted to measuring tanks, pipe line or other storage vessels as in conventional practice. The bottom head 5 may carry a drain duct 98 having an inlet 99 connected with the lowermost point in the head. The duct 98 extends laterally and connects with a coupling 100 located in the supporting band 6 and which in turn is adapted to be connected with an offtake pipe 100'. The compartment 10 also has a drain 98' for draining the compartment when desired. Thus, the heating compartment can be drained without draining the separating compartment. Also, the heating compartment may be drained without draining the settling compartment by closing the valve 96.

The form of the invention shown in Fig. 6 is substantially the same as that illustrated in Figs. 1 to 5 inclusive, with the exception that the outer tube 73 abuts against the underface of the partition 8 and is welded or otherwise attached thereto so that the gas evolved incidental to breaking of the emulsion rises through a tube 104 that extends upwardly from an opening 105 in the partition 8 through the layers of water and emulsion and terminates within the gas space of the compartment. The evolved gas thus mixes with the free gas in the separating chamber 10 and all the gas passes down through the pipe 48 and is discharged through the pipe 54. The separator is also preferably provided with a gas outlet 52 but it is used only when it is desirable to take heavy gas to a gasoline plant.

Since the pipe 104 extends up into the top of the chamber 10 where the temperature is that of the flowing components of the influent, the pipe serves as a condenser to return condensible vapors for maintaining the quality of the oil. The sides of the settling chamber above the liquid also act as a condensing surface. Therefore, even though the bottom of the top compartment 10 should become covered with scale and bottom settlings to the extent that very little heat exchange is effected therethrough, the surface exposed in the settling compartment 12 provides for satisfactory condensation.

In using the apparatus for example in treating the fluid from a petroleum producing well, the pipe 13 may be connected with the flow tubing in the well, the pipes 53 and 54 with a source of gas use, the pipe 97 with a source of water disposal, and the oil outlet 55 with a suitable oil receiver. The burner 69 is connected with a fuel source and the apparatus is placed in operation by opening flow through the above described service pipes and lighting the burner 69. The fluid or flow from the well upon discharge through the inlet 14 is caused to swirl about the inner circumference of the compartment by the deflector 15. The liquid components of the influent gravitate toward the bottom of the compartment with the free water separating in a layer 16 supported directly on the bottom 8. The oil and oil water emulsion being of less density rise to the top of the free water and collect in a layer 25 which floats upon the layer of free water 16. The free gas component of the liquid influent rises in the compartment 10 and passes the spray baffle 51 to discharge through the gas conductor pipe 53. The gas may also escape through the pressure equalizing pipe 48 into the gas space 50 at the top of the compartment 12 for discharge through the pipe 54. The free gas and free water are thus separated from the oil and oil water emulsion at substantially the temperature of the well fluid. Consequently, the gas and free water are relatively cold as compared to the preheated oil and oil water emulsion as later described. Therefore, the layer of free water 16 cools the partition 8 and provides a cool area on the underside to be contacted by the gas rising in the gas space 50 of the compartment 12.

The free water passes through the opening 31 into the tube 19 and rises therein to overflow into the open upper end 21 of the conductor pipe 22 where it is lead downwardly into the compartment 11 which, if it has not already been filled with water, fills the space in the compartment 11 and rises through the tube or flume 72 and through bypass 78 until a body of water 77 is established in the bottom of the compartment 12 having a level below the filter 81, which level is indicated at 42 and is controlled by positioning the outlet of the telescoping section 37 of the water discharge siphon 35 within the member 39.

The products of combustion resulting from the burning fuel in the heater 24 heats the walls of the heater tube 60 to raise the temperature of the liquid which immediately surrounds the heater to a temperature sufficient to break the emulsion.

The oil and oil-water emulsion collecting in the layer 25 overflows into the inlet 26 of the conductor 27 and passes through the outside heat exchanger 30 wherein the liquids are preheated by passing them in heat exchange relation with hot treated oil discharged from the apparatus as later described. The preheated oil and oil-water emulsion passes from the preheater 30 through the pipe 56 into the space under the distributor pan 57 and is discharged in sheet-like formation substantially under the heater tube 60 and throughout most of its length for travel upwardly through the inner tube or flume 72 where all the gas which has been liberated by heat separates and passes out through the ports 74 at the upper end of the outer flume or tube 73 to collect in the gas space 50. The liberated gas thus moves in sweeping contact with the relatively cold bottom surface of the partition 8 and the exposed wall surface of the compartment 12 so that the gas condenses and condensate drops into the body of oil in the settling compartment 12. The gas-free emulsion and any entrained oil continues to flow downwardly through the passageway 76 between the respective flumes and is discharged into the settling compartment in the vicinity of the oil water interface designated 42.

The oil component of the emulsion rises upwardly through the filter 81 if a filter is used and collects in the compartment to the level of the weir 43. The water component of the emulsion drops out below the filter and collects in the layer of water 77. Excess water as it accumulates flows through the outlet 79 and conductor 78 and through the port 80 into the compartment 11. Water dropping out from the emulsion in the compartment 11 drops into the cool water at the bottom of the compartment so that it quickly attains the temperature of the free water and is rapidly discharged therewith through the filters 34 and conductor 33 which leads the water to the water siphon for disposal through the pipe 97.

The presence of free water in the bottom of the compartment 11 does not appreciably increase the amount of the heat which the firebox must deliver.

With this arrangement it is obvious that the gas is liberated within the flumes 72 and 73 and passes off without disturbing the settling action of the liquids within the compartment 12. It is also obvious that the hot gases discharged from the flume are readily cooled and condensed with the condensed fractions dropping into the settling section so as to maintain gravity and promote stabilization of the oil product.

Should any vapors not condense within the gas space 50, they rise through the pressure equalizing tube 48 and mix with the cold gas in the gas space 20 at the top of the compartment 10. This additional cooling causes further condensation and conservation of the vapors as the condensate collects in the oil and emulsion layer for return to the treating section by way of the preheater. If desired, a filter may be used in the compartment 10 in the same manner as the filter 81 illustrated and described in the compartment 12.

It is pointed out that with the present apparatus the necessity of baffles and tortuous passageways which have been previously required, are eliminated. Therefore, the settling space in the compartment 12 is of relatively larger capacity which means more complete oil and water separation and an increase in settling volume allows corresponding increase in treating capacity.

Attention is directed to the fact that any oil or emulsion entrained with the cold free water passes therewith into the heating compartment 11 and will rise around the heater along with the oil and emulsion. This arrangement makes negligible loss of oil through the water drawoff pipe 97.

It is obvious that since the entire diameter of the compartment 10 is used for gas separation the apparatus has a substantially large gas handling capacity which promotes further efficiency and since the first separation of free gas is made cold, there is less loss of gravity building vapors through the gas discharge pipe 53.

From the foregoing it is obvious that I have provided a method and apparatus for treating petroleum liquids containing free water, gas, oil and oil emulsions which is of high capacity and is adapted for economical and efficient treatment of such mixtures in a shorter processing time.

What I claim and desire to secure by Letters Patent is:

1. The method of treating petroleum mixtures containing free water and gas together with an oil-water emulsion including, separating the free gas and free water from the oil-water emulsion, heating said emulsion after separation of the free gas and water to free the water and oil components of said emulsion, settling the water component from the oil component, keeping the vapors evolved in the heating of said emulsion out of contact with settled water and oil components while bringing said vapors into heat exchange relation with the relatively cool free water for condensing said vapors, and returning the condensate to the separated oil component.

2. The method of treating petroleum mixtures containing free water and gas together with an oil-water emulsion including, separating the free gas and free water from the oil-water emulsion, passing said emulsion through a heating zone to free the water and oil components of said emulsion, settling said water and oil components in a settling zone separate from the heating zone, keeping vapors evolved in the heating of said emulsion out of contact with the oil and water in the settling zone while bringing said vapor into heat exchange relation with the relatively cool free water for condensing said vapors, returning the condensate to the separated oil component, conducting the free water to the bottom portion of said heating zone separately of the oil-water emulsion, removing surplus water from the heating zone and separately removing the oil and water from the settling zone.

3. The method of treating petroleum mixtures containing free water and gas together with an oil-water emulsion including, separating the free gas and water from the oil-water emulsion, conducting the oil-water emulsion through a wash liquid in the presence of heat sufficient to break the emulsion, settling the hot separated oil and water components of the emulsion in a settling zone, removing the hot settled oil from the settling zone in heat exchange relation with the oil-water emulsion during conduction of the emulsion from the place of free gas and water separation to the wash liquid to preheat the oil-water emulsion, and conducting the free water from the place of separation to said wash liquid separately of the oil-water emulsion, and removing surplus water from the wash liquid.

4. The method of treating petroleum mixtures containing free water and gas together with an oil-water emulsion including separating the free water and gas from the oil-water emulsion in a separating zone, maintaining layers of separated oil-water emulsion and free water in the separating zone, removing the oil-water emulsion layer, removing free water from the free water layer, passing the removed oil-water emulsion through a wash solution while heating said oil-water emulsion to a temperature sufficient to break the emulsion, conducting the liquid components of the emulsion to a settling zone for settling out of the water component of the emulsion, freeing vapors evolved incidental to heating of the emulsion from the liquid components before the liquid components reach the settling zone, conducting said vapors into heat exchange contact with said layer of water in the separating zone to effect condensation of said vapors into the settling zone for enriching the oil component of the emulsion, passing the oil compotient of the emulsion from the settling zone into heat exchange relation with the oil-water emulsion conducted from the separating zone for preheating the oil and water emulsion, and removing the free gas from the separating zone.

5. The method of treating petroleum mixtures containing free water and gas together with an oil-water emulsion including separating the free water and gas from the oil-water emulsion in a separating zone without initially heating the mixture, maintaining layers of separated water and oil-water emulsion in the separating zone, removing the oil-water emulsion from said emulsion layer, passing the removed oil-water emulsion through a wash solution while heating said emulsion to a temperature sufficient to break the emulsion, conducting the liquid components of the emulsion to a settling zone for settling out of the water component of the emulsion, passing any vapors evolved incidental to heating of the emulsionn into heat exchange contact with said layer of water in the separating zone without passing the vapor through the settling liquid to effect condensation of said vapors and dropping said condensate into the settling zone for enriching the oil component of the emulsion, passing the oil component of the emulsion from the settling zone into heat exchange relation with the oil-water emulsion conducted from the separating zone for preheating the oil and water emulsion, and removing free water and gas from the separating zone.

6. The method of treating petroleum mixtures containing free water and gas together with an oil-water emulsion including separating the free water and gas from the oil emulsion in a separating zone, maintaining layers of separated water and emulsion in the separating zone, removing the oil-water emulsion from said emulsion layer, passing the removed oil-water emulsion through a heating zone to heat said emulsion to a temperature sufficient to break the emulsion, conducting the liquid components of the emulsion to a settling zone for settling out of the water component of the emulsion, removing vapors liberated in the heating of the emulsion from said liquid components before said components are delivered to the settling zone, passing vapors evolved incidental to heating of the emulsion into heat exchange contact with said layer of free water in the separating zone to effect condensation of said vapors into the settling zone for enriching the oil component, passing the oil component of the emulsion from the settling zone into heat exchange relation with the oil-water emulsion conducted from the separating zone for preheating the oil-water emulsion, conducting the separated free water from said layer in the separating zone into the lower portion of the heating zone for freeing any entrained oil and oil-water emulsion into said heating zone, removing water from the liquid wash zone, and removing the free gas from the separating zone.

7. The method of treating petroleum mixtures containing free water and gas together with an oil-water emulsion including separating the free water and gas from the oil-water emulsion in a separating zone, maintaining layers of separated water and emulsion in the separating zone, removing the oil-water emulsion from said emulsion layer, passing the removed oil-water emulsion through a heating zone to heat said emulsion to a temperature sufficient to break the emulsion, conducting the liquid components of the emulsion to a settling zone for settling out of the water component of the emulsion, removing vapors liberated in the heating of the emulsion from said liquid components before said components are delivered to the settling zone, passing vapors evolved incidental to heating of the emulsion into heat exchange contact with said layer of free water in the separating zone to effect condensation of said vapors into the settling zone for enriching the oil component, passing the oil component of the emulsion from the settling zone into heat exchange relation with the oil-water emulsion conducted from the separating zone for preheating the oil-water emulsion, conducting the separated free water from said layer in the separating zone into the lower portion of the heating zone for freeing any entrained oil and oil-water emulsion into said liquid wash zone, removing water from the heating zone, passing any uncondensed vapors from the settling zone into contact with the free gas in said separating zone, and removing the free gas from the separating zone.

8. An apparatus of the character described for treating a petroleum mixture containing free water and gas together with an oil-water emulsion including a vessel, an upper partition within the vessel and forming a bottom of an upper gas separating compartment and the top of a settling compartment in said vessel, a lower partition in the vessel forming the bottom of the settling compartment and top of a heating compartment within the bottom of said vessel, means for passing the mixture into the separating compartment for separation of the free water and emulsion from the gas and settlement of the free water and emulsion in separate layers supported on the partition forming the bottom of said separating compartment, a heat exchanger, a duct connecting the separating compartment with the heat exchanger for passing emulsion from the emulsion layer through said heat exchanger, a duct connecting the heat exchanger with said heating compartment for discharging the emulsion into the heating compartment, a heater in said heating compartment for heating the emulsion, an up flume having an inlet through said lower partition for conducting heated emulsion and oil and water components of the emulsion from said heating compartment upwardly for overflow of said flume, a down flume having a vapor outlet at its upper end and extending downwardly away from the upper partition and over the up flume for conducting vapors evolved in said flumes upwardly to said outlet and the oil and water components of the emulsion downwardly into the settling compartment, a conduit for conducting free water from the free water layer, a conduit for discharging water from said heating compartment, means for removing gas from the separating compartment, and means for passing water from said settling compartment.

9. An apparatus of the character described for treating a petroleum mixture containing free water and gas together with an oil water emulsion including a vessel, an upper partition within the vessel and forming a bottom of an upper gas separating compartment and the top of a settling compartment in said vessel, a lower partition in the vessel forming the bottom of the settling compartment and top of a heating compartment within the bottom of said vessel, means for passing the mixture into the separating compartment for separation of the free water and emulsion from the gas and settlement of the free water and emulsion in separate layers supported on the partition forming the bottom of said separating compartment, a heat exchanger, a duct connecting the separating compartment with the heat exchanger for passing emulsion from the emulsion layer through said heat exchanger, a duct connecting the heat exchanger with said heating compartment for discharging the emulsion into the heating compartment, a heater in said heating compartment for heating the emulsion, an up flume connected with said lower partition for conducting heated emulsion from said heating compartment upwardly for overflow of said flume, a down flume having a vapor outlet directly under the upper partition and extending downwardly over the up flume for conducting vapors evolved in said flumes upwardly into heat exchange contact with said partition to effect condensation of said vapors into the oil component of the emulsion, means for removing hot oil from the settling compartment through the heat exchanger, a conduit for connecting free water from the free water layer in said separating compartment, a conductor for discharging water from said heating compartment, means for removing gas from the separating compartment, and means for passing water from said settling compartment.

10. An apparatus of the character described for treating a petroleum mixture containing free water and gas together with an oil-water emulsion including a vessel, an upper partition within the vessel forming a bottom of an upper gas separating compartment and the top of a settling compartment in said vessel, a lower partition in the vessel forming the bottom of the settling compartment and top of a heating compartment within the bottom of said vessel, means for passing the petroleum mixture into the separating compartment for separation of the free water and emulsion in separate layers supported on the upper partition, a heat exchanger, a duct connecting the separating compartment with the heat exchanger for passing emulsion from the emulsion layer through said heat exchanger, a duct connecting the heat exchanger with said heating compartment for discharging the emulsion into the heating compartment, a heater in said heating compartment for heating the emulsion, an up flume having an inlet through the lower partition for conducting heated emulsion from said heating compartment upwardly for overflow into the settling compartment, a down flume extending downwardly over the up flume for conducting vapors evolved in said flumes upwardly and having a vapor outlet at the upper end for discharging said vapors, a conduit for conducting free water from the free water layer in said separating compartment for discharge into the heating compartment at a point below said heater, a conductor for discharging water from said heating compartment, a conductor for discharging water from said settling compartment into the heating compartment, and a conductor for passing oil in the settling compartment through said heat exchanger for preheating said emulsion.

11. An apparatus of the character described for treating a liquid pertoleum mixture containing free water and gas together with an oil-water emulsion including a vessel, an upper partition within the vessel and forming a bottom of an upper gas separating compartment and the top of a settling compartment in said vessel, a lower partition in the vessel forming the bottom of the settling compartment and top of a heating compartment within the bottom of said vessel, means for passing the mixture into the separating compartment for separation of the free water and emulsion in separate layers to be supported on the upper partition, a duct means connecting the separating compartment with the heating compartment, a heater in said heating compartment for heating the emulsion, an up flume having an inlet through said lower partition for conducting heated emulsion from said heating compartment upwardly for overflow into the settling compartment, a down flume having a vapor outlet directly under the upper partition and extending downwardly over the up flume for conducting vapors evolved in said flumes upwardly into heat exchange contact with said partition to effect condensation of said vapors into the oil component of the emulsion, a conduit for conducting free water from the free water layer in said separating compartment for discharge into the heating compartment, a conductor for discharging water from said heating compartment, a conductor for discharging water from the settling compartment into the heating compartment, a conductor for passing oil from the settling compartment, and a water siphon in said water discharge conductor.

12. An apparatus of the character described for treating a liquid petroleum mixture containing free water and gas together with an oil water emulsion including a vessel, an upper partition within the vessel and forming a bottom of an upper gas separating compartment and the top of a settling compartment in said vessel, a lower partition in the vessel forming the bottom of the settling compartment and top of a heating compartment within the bottom of said vessel, means for passing the liquid petroleum mixture into the separating compartment for separation of the free water and emulsion in layers supported on the upper partition, a heat exchanger, a duct connecting the separating compartment with the heat exchanger for passing emulsion from the emulsion layer through said heat exchanger, a duct connecting the heat exchanger with said heating compartment for discharging the emulsion into the heating compartment, a heater in said heating compartment for heating the emulsion, an up flume having inlet from the heating compartment for conducting heated emulsion from said heating compartment upwardly for overflow into the settling compartment, a down flume suspended from the upper partition and extending over the up flume for conducting vapors evolved in said flumes upwardly, a vent connecting the down flume with gas space in the separating compartment, means for conducting free water from the free water layer in said separating compartment, means for discharging gas from the gas space, a conductor for discharging water from the settling compartment, and a conductor for passing oil from the settling compartment.

13. An apparatus of the character described for treating a liquid petroleum mixture containing free water and gas together with an oil-water emulsion including a vessel, an upper partition within the vessel and forming a bottom of an upper gas separating compartment and the top of a settling compartment in said vessel, a lower partition in the vessel forming the bottom of the settling compartment and top of a heating compartment within the bottom of said vessel, means for passing the liquid petroleum into the separating compartment for separation of the free water and emulsion in layers supported on the upper partition, a heat exchanger, a duct connecting the separating compartment with the heat exchanger for passing emulsion from the emulsion layer through said heat exchanger, a duct connecting the heat exchanger with said heating compartment for discharging the emulsion into the heating compartment, a heater in said heating compartment for heating the emulsion, an up flume connected with said lower partition for conducting heated emulsion from said heating compartment upwardly for overflow into the settling compartment, a down flume having a vapor outlet directly under the upper partition and extending downwardly over the up flume for conducting vapors evolved in said flumes upwardly into heat exchange contact with said partition to effect condensation of said vapors into the oil component of the emulsion, a conduit for conducting free water from the free water layer in said separating compartment for discharge into the heating compartment at a point below said heater, a conductor for discharging water from said heating compartment, a conductor for discharging water from the settling compartment into the heating compartment, a conductor for passing oil in the settling compartment through said heat exchanger for preheating said emulsion, means for maintaining predetermined level of oil in the settling compartment and a gas space below said upper partition, a gas equalizer tube connecting said gas space with a gas space in the separating compartment, and means for removing gas from the separating compartment.

14. An apparatus of the character described for treating a liquid petroleum mixture containing free water and gas together with an oil water emulsion including a vessel, an upper partition within the vessel and forming a bottom of an upper gas separating compartment and the top of a settling compartment in said vessel, a lower partition in the vessel forming the bottom of the settling compartment and top of a heating compartment within the bottom of said vessel, means for passing the liquid petroleum mixture into the separating compartment for separation of the free water and emulsion in separate layers supported on the partition forming the bottom of said separating compartment, duct means connecting the separating compartment with said heating compartment for discharging the emulsion into the heating compartment, a heater in said heating compartment for heating the emulsion, means for conducting heated emulsion from said heating compartment into the settling compartment, a conduit for conducting free water from the free water layer in said separating compartment downwardly through the settling compartment for discharge into the heating compartment at a point below said heater, a conductor for discharging water from said heating compartment, a conductor for discharging water from the settling compartment into the heating compartment, a conductor for passing oil from the settling compartment, and a gas outlet connection for the separating compartment.

15. An apparatus of the character described for treating a petroleum mixture containing free water and gas together with an oil-water emulsion including a vessel, an upper partition within the vessel forming a bottom of an upper gas separating compartment and the top of a settling compartment in said vessel, a lower partition in the vessel forming the bottom of the settling compartment and top of a heating compartment within the bottom of said vessel, means for passing the petroleum mixture into the separating compartment for separation of the free water and emulsion in separate layers supported on the upper partition, a heat exchanger, a duct connecting the separating compartment with the heat exchanger for passing emulsion from the emulsion layer through said heat exchanger, a duct connecting the heat exchanger with said heating compartment for discharging the emulsion into the heating compartment, a heater in said heating compartment for heating the emulsion, an up flume having an inlet through the lower partition for conducting heated emulsion from said heating compartment upwardly for overflow into the settling compartment, a down flume extending downwardly over the up flume for conducting vapors evolved in said flumes upwardly, and having a vapor outlet at the upper end for discharging said vapors into heat exchange contact with said partition to effect condensation of said vapors into the oil component of the emulsion, a conduit for conducting free water from the free water layer in said separating compartment for discharge into the heating compartment at a point below said heater, a conductor for discharging water from said heating compartment, a conductor for discharging water from said settling compartment into the heating compartment, and means cooperating with the oil conductor for maintaining a fixed level of oil in spaced relation below the upper partition for exposing the upper wall portion of the settling compartment to provide additional condensing surface for said vapors, and a conductor for passing oil in the settling compartment through said heat exchanger for preheating said emulsion.

16. An apparatus of the character described for treating a petroleum mixture containing free water and gas together with an oil-water emulsion including a vessel, an upper partition within the vessel forming a bottom of an upper gas separating compartment and the top of a settling compartment in said vessel, a lower partition in the vessel forming the bottom of the settling compartment and top of a heating compartment within the bottom of said vessel, means for passing the petroleum mixture into the separating compartment for separation of the free water and emulsion in separate layers supported on the upper partition, a heat exchanger, a duct connecting the separating compartment with the heat exchanger for passing emulsion from the emulsion layer through said heat exchanger, a duct connecting the heat exchanger with said heating compartment for discharging the emulsion into the heating compartment, a heater in said heating compartment for heating the emulsion, an up flume having an inlet through the lower partition for conducting heated emulsion from said heating compartment upwardly for overflow into the settling compartment, a down flume extending downwardly over the up flume for conducting vapors evolved in said flumes upwardly, and having a vapor outlet at the upper end for discharging said vapors into heat exchange contact with said partition to effect condensation of said vapors into the oil component of the emulsion, a conduit for conducting free water from the free water layer in said separating compartment for discharge into the heating compartment at a point below said heater, a conductor for discharging water from said heating compartment, a conductor for discharging water from said settling compartment into the heating compartment, a valve in said last named conductor for shutting off flow from the settling compartment to the heating compartment, means cooperating with the oil conductor for maintaining a fixed level of oil in spaced relation below the upper partition for exposing the upper wall portion of the settling compartment to provide additional condensing surface for said vapors, and a conductor for passing oil in the settling compartment through said heat exchanger for preheating said emulsion.

17. An apparatus of the character described for treating a petroleum mixture containing free water and gas together with an oil-water emulsion including a vessel, an upper partition within the vessel forming a bottom of the separating compartment and the top of a settling compartment in said vessel, a lower partition in the vessel forming the bottom of the settling compartment and top of a heating compartment within the bottom of said vessel, means for passing the petroleum mixture into the separating compartment for separation of the free water and emulsion in separate layers supported on the upper partition, duct means connecting the separating compartment with said heating compartment for discharging emulsion from the emulsion layer into the heating compartment, a heater in said heating compartment for heating the emulsion, an up flume having an inlet through the lower partition for conducting heated emulsion from said heating compartment upwardly for overflow into the settling compartment, a down flume extending downwardly over the up flume for conducting vapors evolved in said flumes upwardly, a duct connected with the upper end of the up flume and extending into the separating compartment and terminating in a free gas separating space above said layers, a conduit for conducting free water from the free water layer in said separating compartment for discharge into the heating compartment at a point below said heater, a conductor for discharging water from said heating compartment, a conductor for discharging water from the settling compartment, a conductor having an inlet spaced below the upper partition to provide an outlet for the oil and to maintain an oil level for leaving a gas space below the upper partition, a duct connecting the gas separating space in the separating compartment with the gas space in the settling compartment for conducting separated gas and vapors from said duct into the gas space of the settling compartment, and means for discharging the gas and vapors from the gas space in the settling compartment.

18. The method of treating petroleum mixtures containing free water and gas together with an oil-water emulsion including, separating the free gas and water from the oil-water emulsion, conducting the oil-water emulsion through a heating zone to break the emulsion, conducting the hot separated oil and water components of the emulsion from the heating zone through a gas separating stage to a settling zone to separate evolved gas, said settling zone being separate from the heating zone, separating oil and water in the settling zone without interference by the evolved gas, and removing the hot settled oil from the settling zone in heat exchange relation with the oil-water emulsion after separation of the free water and gas and during conduction of the emulsion to the heating zone to preheat the oil-water emulsion.

ISAAC W. LOVELADY.

REFERENCES CITED

The following references are of record in the file of this patent:

UNITED STATES PATENTS

| Number | Name | Date |
| --- | --- | --- |
| 2,181,687 | Walker | Nov. 28, 1939 |
| 2,256,695 | Walker | Sept. 25, 1941 |
| 2,297,297 | Walker | Sept. 29, 1942 |
| 2,319,962 | Walker | May 25, 1943 |
| 2,384,222 | Walker | Sept. 5, 1945 |